United States Patent [19]
Noll

[11] Patent Number: 5,326,196
[45] Date of Patent: Jul. 5, 1994

[54] PILOT DRILL BIT

[76] Inventor: Robert R. Noll, 2315 Willow Rd., Port Washington, Wis. 53074

[21] Appl. No.: 78,922

[22] Filed: Jun. 21, 1993

[51] Int. Cl.⁵ .......................... B23B 51/02; B23B 51/06
[52] U.S. Cl. .......................................... 408/56; 408/57; 408/225
[58] Field of Search ................. 408/56, 57, 60, 199, 408/200, 223, 224, 225, 233, 713

[56] References Cited

U.S. PATENT DOCUMENTS

| 2,867,140 | 1/1959 | Setts | 408/57 |
| 4,116,578 | 9/1978 | Selfard et al. | 408/225 |
| 4,561,812 | 12/1985 | Linden | 408/225 |

FOREIGN PATENT DOCUMENTS

| 482982 | 4/1992 | European Pat. Off. | 408/57 |
| 1041324 | 10/1958 | Fed. Rep. of Germany | 408/224 |
| 1014236 | 6/1952 | France | 408/225 |
| 968745 | 9/1964 | United Kingdom | 408/223 |

Primary Examiner—Daniel W. Howell
Attorney, Agent, or Firm—E. Michael Combs

[57] ABSTRACT

A pilot drill bit includes a shank, with an abutment flange mounted fixedly to the shank, and coaxially aligned relative to the shank and the abutment flange are a plurality of drill sections of decreasing diameter terminating in a tip, with the sections arranged and sized for drill taps.

3 Claims, 4 Drawing Sheets

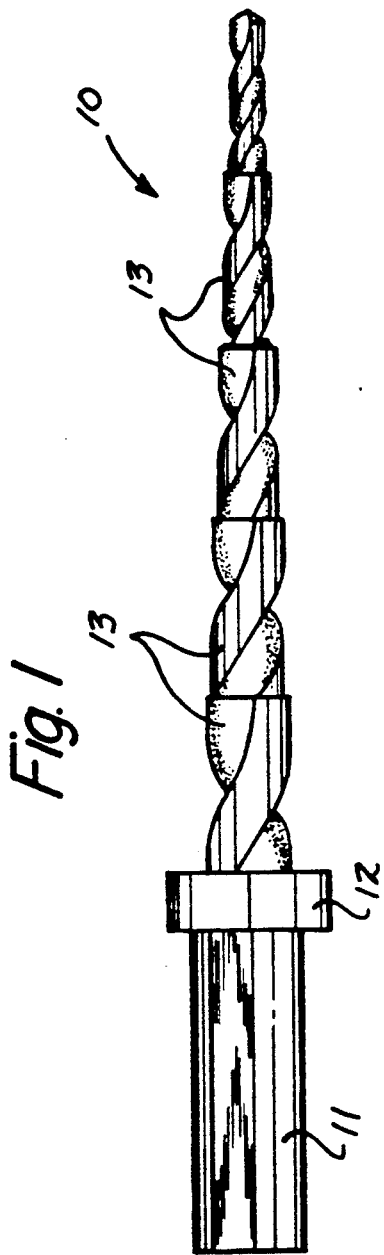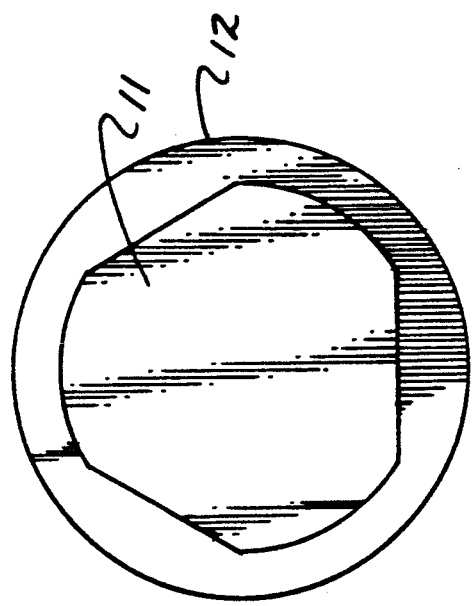

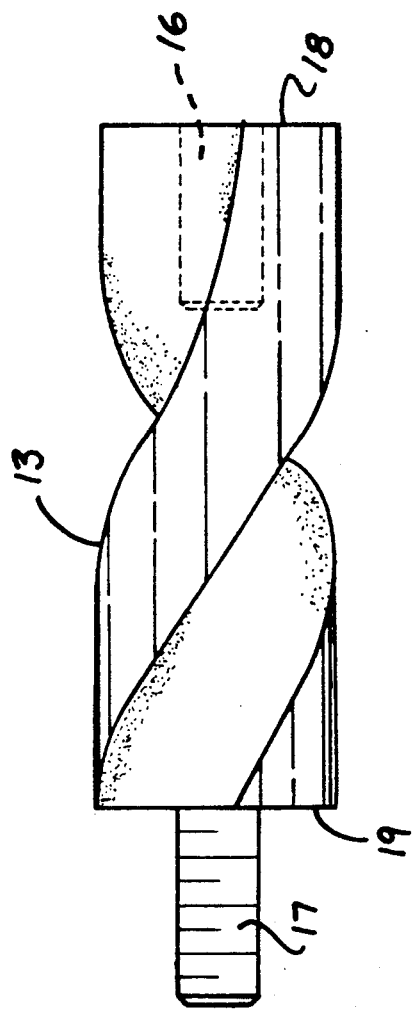
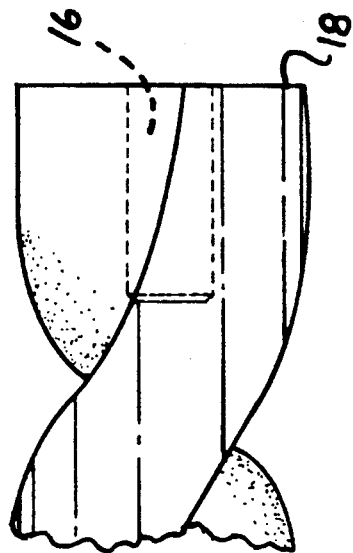
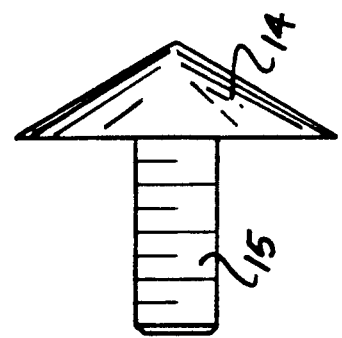
Fig. 3
Fig. 4

PILOT DRILL BIT

BACKGROUND OF THE INVENTION

1. Field of the Invention

The field of invention relates to pilot bit structure, and more particularly pertains to a new and improved pilot drill bit wherein the same is arranged to provide for a series of drill bit sections coaxially aligned and sized for associated drill taps.

2. Description of the Prior Art

Pilot drills of various types have been utilized in the prior art, wherein the instant invention attempts to overcome deficiencies of the prior art by providing for a pilot drill specifically sized and arranged for drilling within metallic workpieces and the like and sized for drill taps.

SUMMARY OF THE INVENTION

In view of the foregoing disadvantages inherent in the known types of drill bit structure now present in the prior art, the present invention provides a pilot drill bit wherein the same includes a series of spaced pilot drill sections varying in diameter from 0.213 inch to 0.104 inch. As such, the general purpose of the present invention, which will be described subsequently in greater detail, is to provide a new and improved pilot drill bit which has all the advantages of the prior art drill bit structure and none of the disadvantages.

To attain this, the present invention provides a pilot drill bit including a shank, with an abutment flange mounted fixedly to the shank, and coaxially aligned relative to the shank and the abutment flange are a plurality of drill sections of decreasing diameter terminating in a tip, with the sections arranged and sized for drill taps.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pilot drill bit which has all the advantages of the prior art drill bit structure and none of the disadvantages.

It is another object of the present invention to provide a new and improved pilot drill bit which may be easily and efficiently manufactured and marketed.

It is a further object of the present invention to provide a new and improved pilot drill bit which is of a durable and reliable construction.

An even further object of the present invention is to provide a new and improved pilot drill bit which is susceptible of a low cost of manufacture with regard to both materials and labor, and which accordingly is then susceptible of low prices of sale to the consuming public, thereby making such pilot drill bits economically available to the buying public.

Still yet another object of the present invention is to provide a new and improved pilot drill bit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of the invention.

FIG. 2 is an orthographic view, taken along the lines 2—2 of FIG. 1 in the direction indicated by the arrows.

FIG. 3 is an orthographic view of the invention indicating the drill bit sections arranged for assemblage relative to one another.

FIG. 4 is an orthographic view of the tip structure of the invention.

DESCRIPTION OF THE PREFERRED EMBODIMENT

Figure 5:
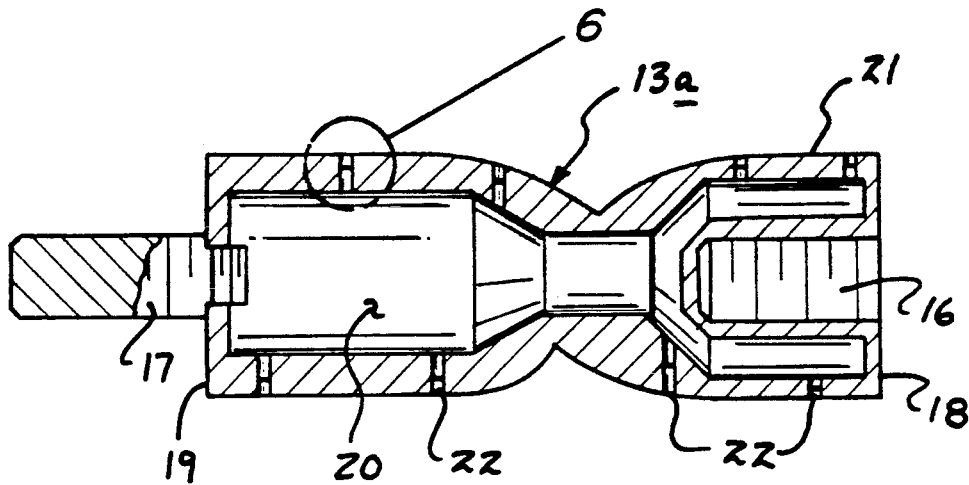
FIG. 5 is an orthographic cross-sectional illustration of a drill bit section.

With reference now to the drawings, and in particular to FIGS. 1 to 8 thereof, a new and improved pilot drill bit embodying the principles and concepts of the present invention and generally designated by the reference numeral 10 will be described.

More specifically, the pilot drill bit 10 of the instant invention essentially comprises a shank 11 mounting an abutment flange 12 orthogonally relative to the shank, with a series of pilot drill sections 13 extending from the abutment flange coaxially aligned relative to the shank and abutment flange, such that the individual drill sections 13 are of descending diametrical sizing from the abutment flange 12 to the forward distal end of the drill bit terminating in a tip. The drill sections are sized in a diameters of respective 0.213 inch, 0.196 inch, 0.156 inch, 0.144 inch, 0.136 inch, and 0.104 inch to accommodate standard drill taps of respective ¼-28, ¼-20, 10-32, 10-24, 8-32, and 6-32 sizings.

The FIG. 3 indicates the sections arranged in an assembled configuration, wherein each of the sections includes a first end wall 18 spaced from a second end wall 19 orthogonally oriented relative to the associated axis of the drill bit, wherein a threaded socket 16 is directed into the first end wall 18 coaxially aligned with the axis, with a threaded shank 17 directed into the second end wall 19 coaxially aligned with the axis for assembled configuration of the sections, wherein typically the threaded shank portions are of a left-hand thread to enhance their securement relative to one another and to further permit replacement of various sections due to wear and damage. The conical drill tip 14 includes a drill tip threaded shank 15 arranged for securement within an adjacent socket 16 of an outermost drill section 13.

Figure 6:
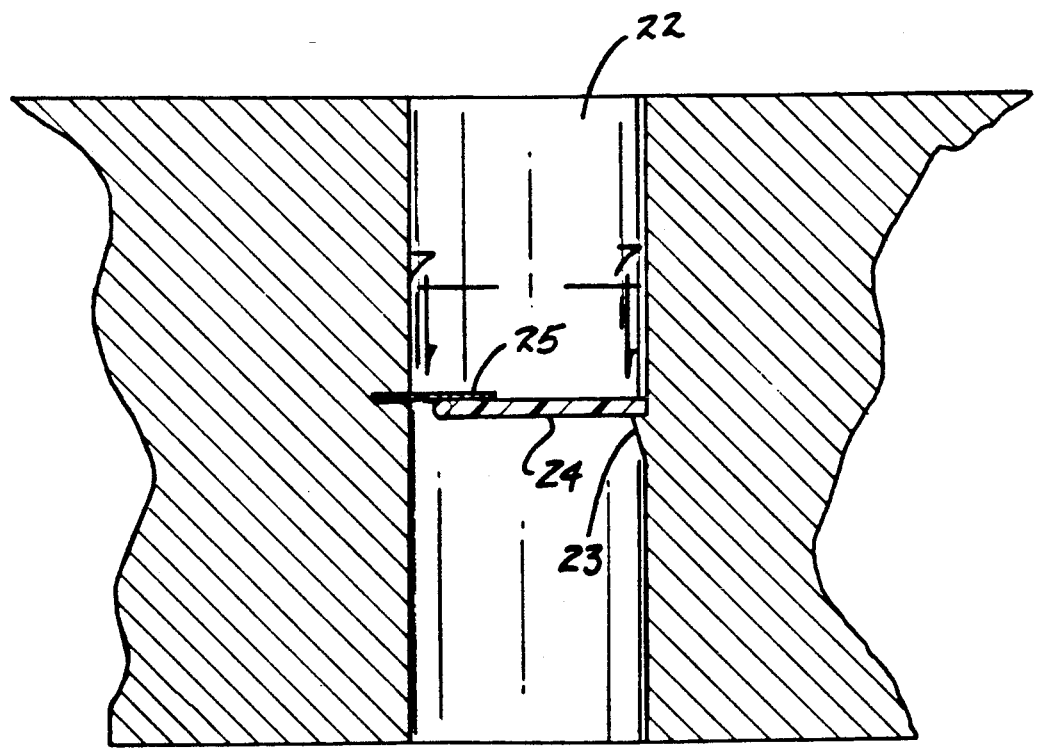
FIG. 6 is an enlarged orthographic view of section 6, as set forth in FIG. 5.

The FIG. 5 indicates the use of a modified drill section 13, having a central fluid cavity 20 arranged to receive cutting lubricant fluid therewithin replenishable through the use of the threadedly removable drill section threaded shank 17 threadedly directed into the second end wall 19. A plurality of fluid delivery conduits 22 radially directed into the section side wall 21 are provided, wherein the side wall 21 includes the helical drill flutes, as illustrated in FIG. 1. Each of the conduits 22 includes a centrifugal valving structure therewithin, such as indicated in FIG. 6, wherein each of the conduits includes an abutment lip 23 arranged to receive a forward end of an inertia door plate 24 biased onto the abutment lip 23 by a spring hinge 25 diametrically mounted relative to the door plate 24 relative to the abutment lip 23.

Figure 7:
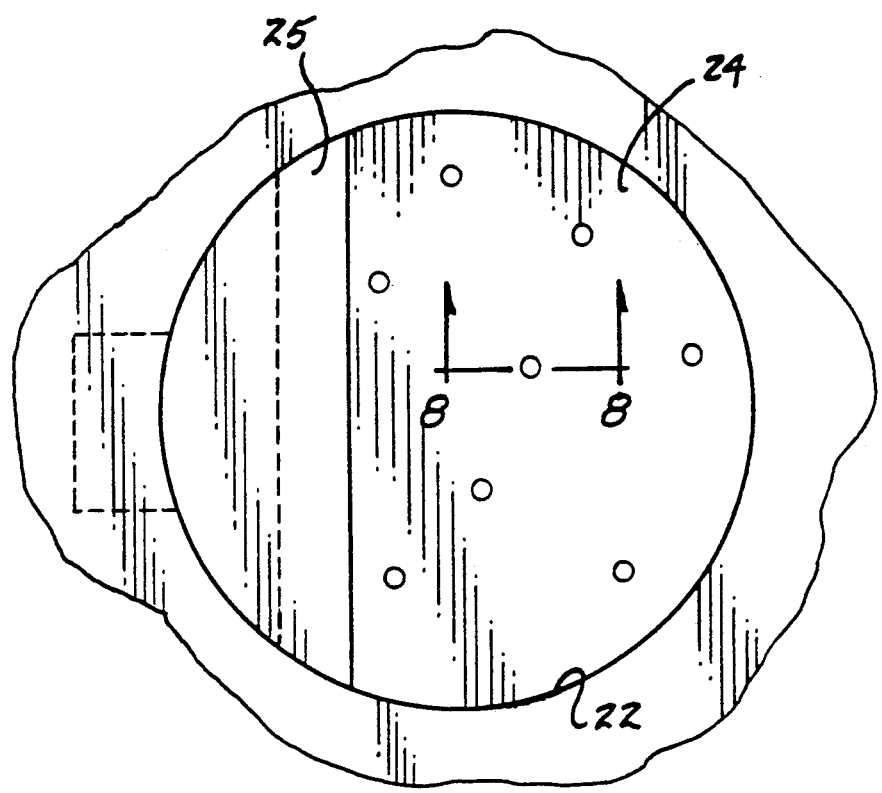
FIG. 7 is an orthographic view, taken along the lines 7—7 of FIG. 6 in the direction indicated by the arrows.
Figure 8:
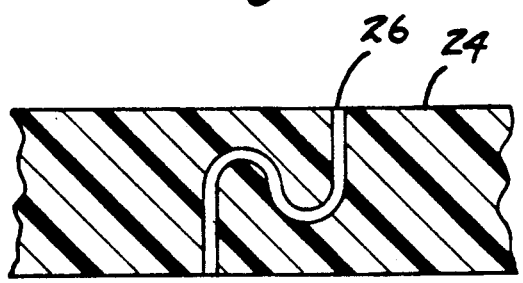
FIG. 8 is an orthographic view, taken along the lines 8—8 of FIG. 7 in the direction indicated by the arrows.

In the FIGS. 7 and 8, the door plate 24 includes a serpentine bore 26, whereupon in the absence of adequate centrifugal force to deflect the door plate 24 from the abutment lip 23, metered fluid is directed through the serpentine bore 26, wherein the serpentine configuration is of a generally S-shaped configuration and prevents excess lubricant to be directed through the door plate, but sufficient to provide lubrication for an associated workpiece during a drilling procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pilot drill bit, comprising,
   an elongate shank, and an abutment flange fixedly and orthogonally mounted to the shank, and
   a series of pilot drill sections of descending diametrical sizing spaced from said abutment flange to an outermost end of the drill bit terminating in a conical tip, and
   each of the drill sections includes a fluted side wall, and wherein the shank, the abutment flange, and the drill sections are coaxially aligned relative to one another, and wherein each of the drill sections includes a first end wall spaced from and parallel a second end wall, wherein the first end wall and the second end wall are orthogonally oriented relative to the axis, and
   each drill section includes a central fluid cavity, and wherein the first end wall includes an internally threaded socket, and wherein the second end wall includes a threaded shank threadedly and removably mounted relative to the second end wall, wherein the threaded socket and the threaded shank are coaxially aligned relative to the axis, and wherein the side wall includes a plurality of fluid lubricant conduits directed therethrough in communication with the central cavity.

2. A drill bit as set forth in claim 1 wherein each of the conduits includes an abutment lip, and wherein an inertia door plate is mounted between the abutment lip and the side wall of said drill section, and wherein the door plate includes a spring hinge diametrically spaced relative to the abutment lip.

3. A drill bit as set forth in claim 2 wherein said door plate includes at least one serpentine bore directed therethrough to effect metering of fluid from the cavity through said serpentine bore.

* * * * *